(12) United States Patent  (10) Patent No.: US 7,911,702 B2
Chang et al.  (45) Date of Patent: Mar. 22, 2011

(54) BEAM SHAPER

(75) Inventors: Kuang-Po Chang, Taichung (TW); Ya-Fu Chuang, Tainan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 71 days.

(21) Appl. No.: 12/420,432

(22) Filed: Apr. 8, 2009

(65) Prior Publication Data
US 2010/0128354 A1  May 27, 2010

(30) Foreign Application Priority Data

Nov. 27, 2008 (TW) .............................. 97145863 A

(51) Int. Cl.
*G02B 27/14* (2006.01)
(52) U.S. Cl. ........................................ 359/636; 359/633
(58) Field of Classification Search .................. 359/618, 359/629, 633, 636
See application file for complete search history.

(56) References Cited

U.S. PATENT DOCUMENTS

| 2003/0035219 A1* | 2/2003 | Tanaka ........................ 359/618 |
| 2003/0123152 A1* | 7/2003 | Sandstrom .................. 359/618 |

\* cited by examiner

*Primary Examiner* — William C Choi
(74) *Attorney, Agent, or Firm* — WPAT, PC; Justin King

(57) ABSTRACT

A beam shaper including a reflection device and a plurality of reflectors. The reflection device is disposed on a transmission path of an incident light beam and has a plurality of reflection surfaces capable of reflecting the incident light beam. The reflection surfaces are capable of splitting the incident light beam into a plurality of reflected light beams. The reflectors are separately disposed on transmission paths of the reflected light beams. The reflectors are capable of reflecting the reflected light beams, so that a shaped light spot is formed by superimposing light spots of the reflected light beams. The reflection device is disposed between the shaped light spot and the reflectors.

19 Claims, 3 Drawing Sheets

BEAM SHAPER

FIELD OF THE INVENTION

The present invention generally relates to an optical device and, more particularly, to a beam shaper.

BACKGROUND OF THE INVENTION

Generally, the intensity distribution of a laser beam is spatially Gaussian. In other words, the intensity of a laser beam decrease progressively from the optical axis outward. Accordingly, the intensity is spatially non-uniform.

In order to uniformize the beam intensity, an optical device, referred to as the beam shaper, has been reported to modify the intensity distribution of a light beam. The beam shaper is capable of shaping the beam to uniformize the intensity distribution. The currently available beam shapers are mostly made using refraction and diffraction for beam shaping.

SUMMARY OF THE INVENTION

The present invention provides a beam shaper capable of performing beam shaping.

The present invention provides a beam shaper, comprising: a reflection device and a plurality of reflectors. The reflection device is disposed on a transmission path of an incident light beam and has a plurality of reflection surfaces capable of reflecting the incident light beam. The reflection surfaces are capable of splitting the incident light beam into a plurality of reflected light beams. The reflectors are separately disposed on transmission paths of the reflected light beams. The reflectors are capable of reflecting the reflected light beams, so that a shaped light spot is formed by superimposing light spots of the reflected light beams. The reflection device is disposed between the shaped light spot and the reflectors.

As stated above, in the present invention, a reflection device and a plurality of reflectors are used to reflect an incident light beam and reflected light beams respectively to form a shaped light spot to achieve shaping the incident light beam.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

Figure 1:
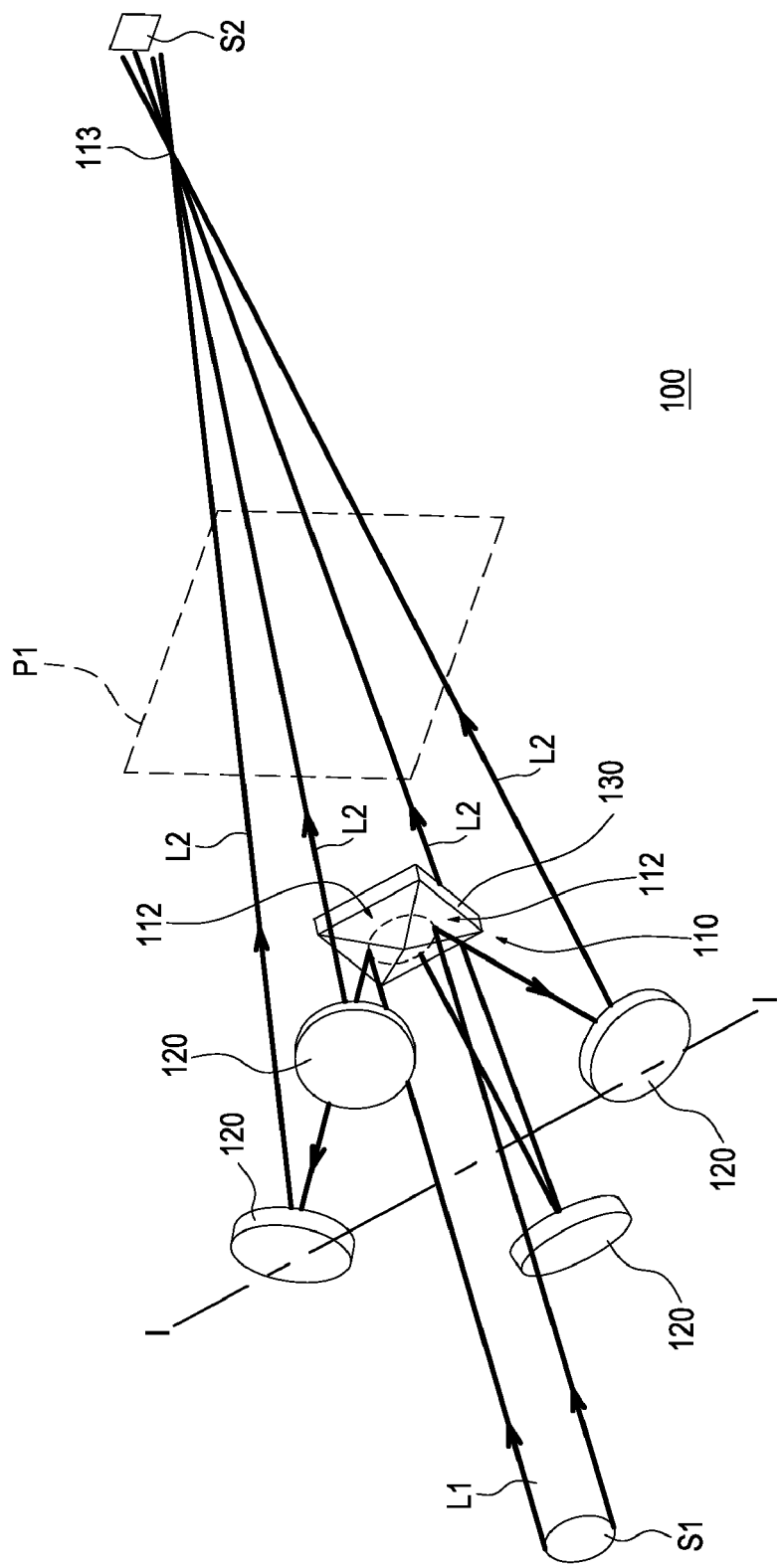
FIG. 1 is a 3D view showing a beam shaper according to one embodiment of the present invention.

FIG. 1 is a 3D view showing a beam shaper according to one embodiment of the present invention. Referring to FIG. 1, the beam shaper 100 of the present embodiment is capable of shaping a light beam with spatially Gaussian distributed intensity into a light beam with uniformly distributed intensity.

More particularly, the beam shaper 100 is capable of shaping an incident light beam L1, wherein the intensity of the incident light beam L1 (for example, a laser beam) is spatially Gaussian distributed. Moreover, incident light beam L1 may exhibit a circular light spot S1 (as shown in FIG. 1) or an oval-shaped light spot.

The beam shaper 100 comprises a reflection device 110 and a plurality of reflectors 120. The reflection device 110 is disposed on a transmission path of an incident light beam L1 and has a plurality of reflection surfaces 112 capable of reflecting the incident light beam L1. The reflection surfaces 112 are capable of splitting the incident light beam L1 into a plurality of reflected light beams L2.

More particularly, the incident light beam L1 irradiates each of the reflection surfaces 112. The part of each of the reflection surfaces 112 being irradiated by the incident light beam L1 reflects part of the incident light beam L1. As a result, the incident light beam L1 is split by the reflection surfaces 112 into the plurality of reflected light beams L2.

These reflectors 120 are separately disposed on transmission paths of the reflected light beams L2 and are capable of reflecting the reflected light beams L2 so that a shaped light spot S2 is formed by superimposing light spots of the reflected light beams L2. Moreover, the reflection device 110 is disposed between the shaped light spot S2 and the reflectors 120, as shown in FIG. 1.

More particularly, these reflectors 120 respectively correspond to the reflection surfaces 112 to receive and reflect the reflected light beams L2 reflected by the reflection device 110. The reflectors 120 do not only reflect the reflected light beams L2 but also converge the reflected light beams L2 so that the reflected light beams L2 are focused. As a result, the light spots corresponding to these reflected light beams L2 are superimposed to form a shaped light spot S2.

More particularly, these reflected light beams L2 are then diverged after they are focused at a focal point 113. The shaped light spot S2 is formed behind the focal point 113. The shaped light spot S2 can be located on a surface of a processed object. For example, if a processed object needs to be drilled, a rectangular aperture can be formed in the present embodiment. The rectangular aperture cannot be manufactured by using a circular Gaussian light beam. In the present embodiment, the reflection device 110 can be formed like a pyramid substantially and the reflection surfaces 112 can be triangular. In other words, the number of the reflection surfaces 112 is four. The reflection surfaces 112 are disposed on top of the pyramid. Therefore, the reflection device 110 is capable of splitting the incident light beam L1 into four reflected light beams L2.

As stated above, in order to enable the reflectors 120 to respectively reflect the reflected light beams L2, the number of the reflectors 120 is equal to the number of the reflection surfaces 112. For example, the number of the reflectors 120 can be four so that each of the reflected light beams L2 can be reflected by one of the reflectors 120.

Moreover, since the reflection device 110 is substantially formed like a pyramid, the reflectors 120 can be arranged in a ring shape around the reflection device 110. As a result, the reflectors 120 can respectively correspond to the reflection surfaces 112 to reflect the reflected light beams L2.

Moreover, the beam shaper 100 may further comprise a base 130 whereon the reflection device 110 is fixedly disposed. The base 130 is formed like a plate (as shown in FIG. 1) or a cylinder. The base 130 and the reflection device 110 can be formed as one.

Figure 2:
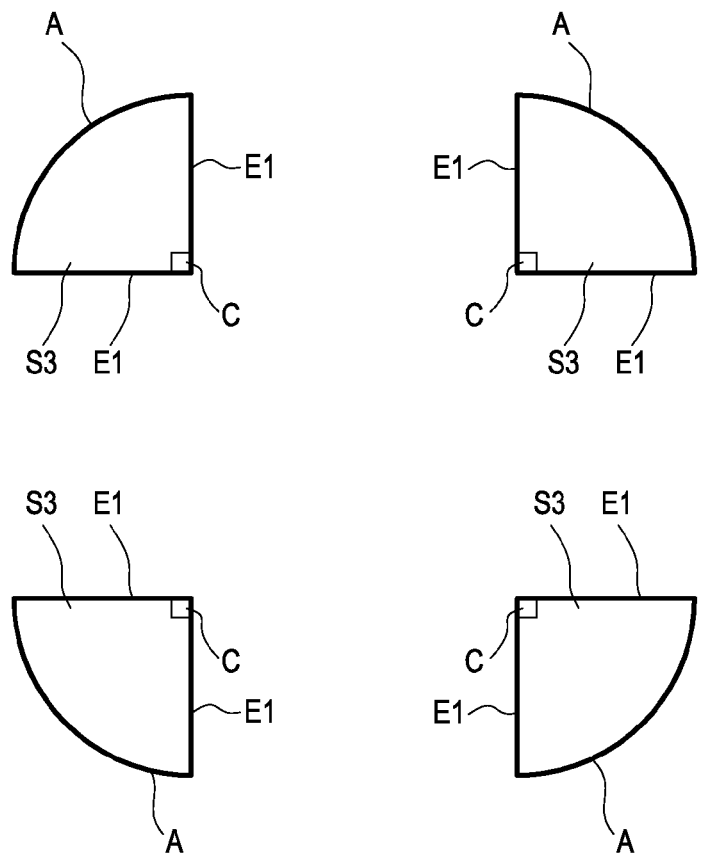
FIG. 2 schematically shows light spots of reflected light beams in FIG. 1.

FIG. 2 schematically shows light spots of reflected light beams in FIG. 1. The fan-shaped light spots S3 in FIG. 2 are formed when the reflected light beams L2 irradiate a reference plane P1 in FIG. 1. Referring to FIG. 1 and FIG. 2, since the incident light beam L1 are split into four reflected light beams L2, the circular light spot S1 corresponding to the incident light beam L1 is divided into four fan-shaped light spots S3. In other words, the fan-shaped light spots S3 are the light spots corresponding to the reflected light beams L2.

Moreover, in the present embodiment, the circular light spot S1 can be equally divided into four fan-shaped light spots S3. In other words, all the radians of the fan-shaped light spots S3 are substantially 90 degrees. In other words, all the angles corresponding to the arcs A of the fan-shaped light spots S3 are 90 degrees.

Figure 3:
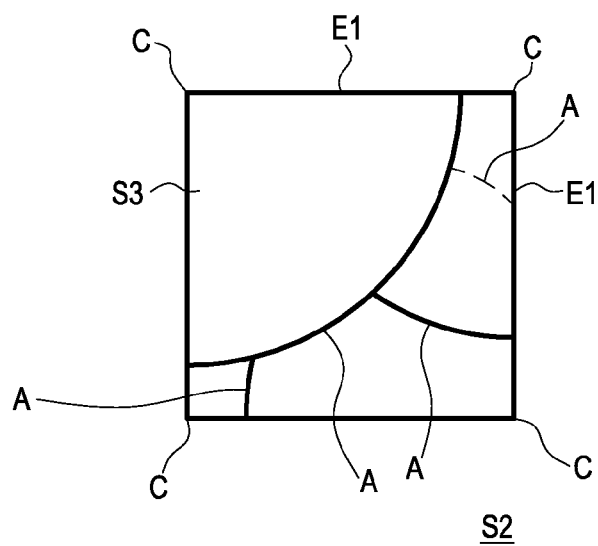
FIG. 3 schematically shows a shaped light spot in FIG. 1.

FIG. 3 schematically shows a shaped light spot in FIG. 1. Referring to FIG. 2 and FIG. 3, after the reflected light beams L2 are further reflected by the reflectors 120, the fan-shaped light spots S3 can be superimposed to form the shaped light spot S2. The shaped light spot S2 is substantially rectangular. More particularly, each of the fan-shaped light spots S3 is provided with a pair of straight sides E1 and a corner C between the straight sides E1. In one fan-shaped light spot S3, the straight sides E1 are substantially perpendicular to each other.

Since the intensity of the incident light beam L1 is spatially Gaussian distributed, the intensity decreases radially from the corner C to the arc A in one fan-shaped light spot S3. As a result, the intensity of one fan-shaped light spot S3 is maximal at the corner C and minimal at the arc A.

When the fan-shaped light spots S3 are superimposed, the straight sides E1 serve as the boundaries of the shaped light spot S2. Meanwhile, the arcs A are interlaced in the shaped light spot S2 and the corners C are located at the corners of the shaped light spot S2. Moreover, it is found in FIG. 1 that, since the reflected light beams L2 are diverged behind the focal point 113, the corners C are located at the corners of the shaped light spot S2 so as to uniformize the intensity distribution. Therefore, the intensity is nearly the same at the boundaries, at the center or at the corners of the shaped light spot S2. As a result, the intensity in the shaped light spot S2 is spatially uniformly distributed.

Figure 4:
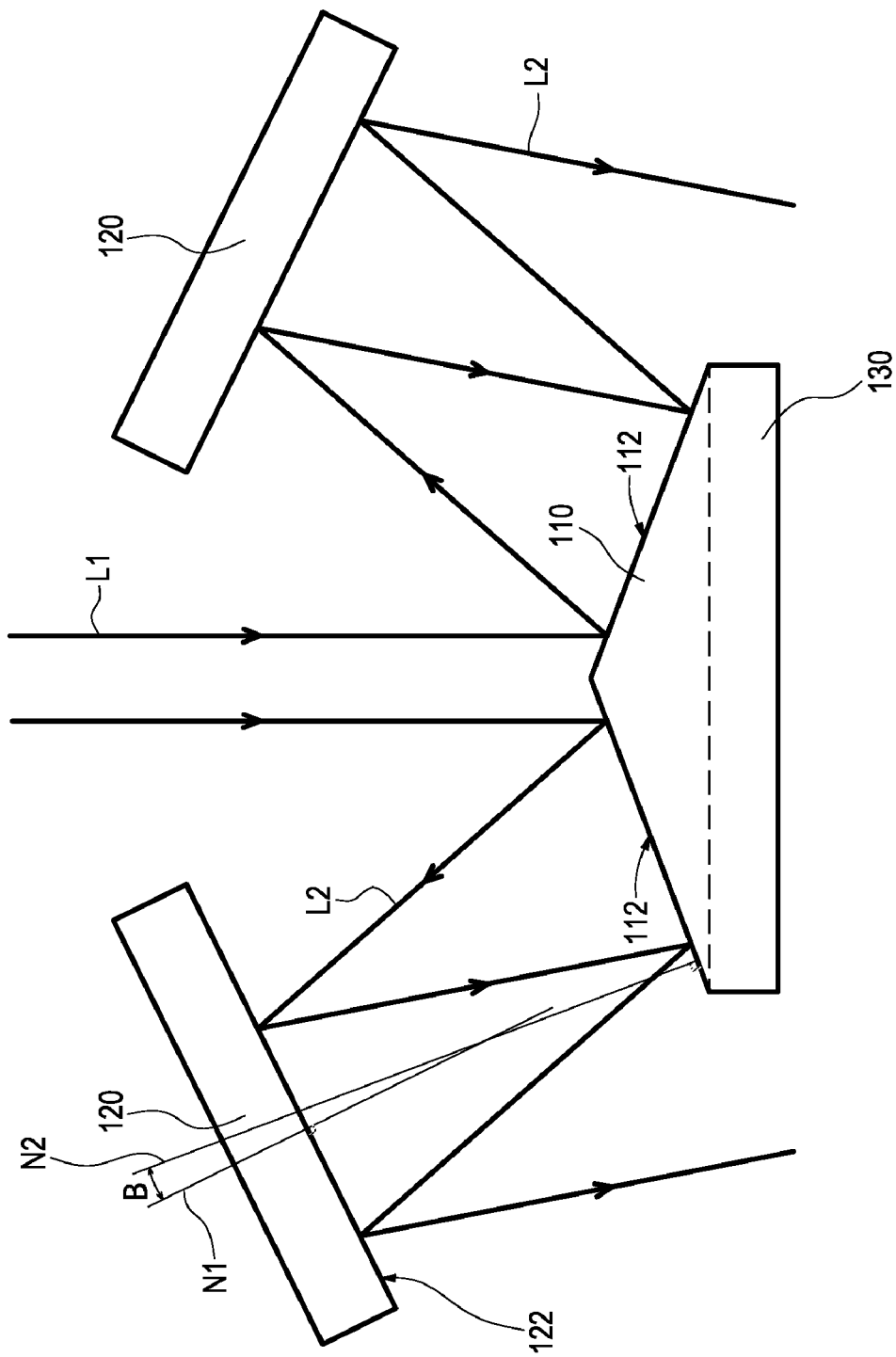
FIG. 4 is a cross-section view of a beam shaper along the line I-I in FIG. 1.

FIG. 4 is a cross-section view of a beam shaper along the line I-I in FIG. 1. In the present embodiment, the reflection device 110 is equally apart from the reflectors 120 substantially. The reflectors 120 can be chirp mirrors capable of reducing the pulse width of a laser beam. For example, when the incident light beam L1 is a laser beam, the pulse width of the reflected light beams L2 can be reduced once the reflected light beams L2 are reflected by the chirp mirrors.

In the present embodiment, the reflected light beams L2 can travel back and forth between the reflectors 120 and the reflection surfaces 112. In other words, the reflected light beams L2 can be repeatedly reflected between the reflectors 120 and the reflection surfaces 112 until the shaped light spot S2 is formed. Therefore, when chirp mirrors are used as the reflectors 120, the pulse width of the reflected light beams L2 can be significantly reduced by the chirp mirrors.

Moreover, the angles of the reflectors 120 can be adjusted to change the working distance of the beam shaper 100. In other words, the distance between the shaped light spot S2 and the reflection device 110 can be adjusted. More particularly, the reflectors 120 comprise a respective reflector surface 122. When the angles of the reflectors 120 are adjusted, the angle B between a normal line N1 to the reflector surface 122 and a normal line N2 to the reflection surface 112 can be changed to further change the transmission paths of the reflected light beams L2. Therefore, the distance of the shaped light spot S2 and the reflection device 110, also referred to as the working distance of the beam shaper 100, can be changed.

As stated above, in the present invention, a plurality of reflection surfaces of a reflection device are used to split the incident light beam into a plurality of reflected light beams that are then converged by a plurality of reflectors to superimpose the light spots of the reflected light beam. As a result, a shaped light spot with uniformly distributed intensity is achieved in the present invention.

Moreover, the beam shaper of the present invention is capable of shaping an incident light beam with a circular light spot or an oval-shaped light spot into a shaped light beam with a rectangular light beam. Therefore, the beam shaper of the present invention is capable of changing the shape of a light spot of an incident light beam.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A beam shaper, comprising:
   a reflection device, disposed on a transmission path of an incident light beam and comprising a plurality of reflection surfaces capable of reflecting the incident light beam and splitting the incident light beam into a plurality of reflected light beams; and
   a plurality of reflectors, separately disposed on transmission paths of the reflected light beams and capable of reflecting the reflected light beams so that a shaped light spot is formed by superimposing light spots of the reflected light beams;
   wherein the reflection device is disposed between the shaped light spot and the reflectors, the reflection device is formed like a pyramid, and the reflection surfaces are triangular.

2. The beam shaper as recited in claim 1, further comprising:
   a base whereon the reflection device is fixedly disposed.

3. The beam shaper as recited in claim 2, wherein the base is formed like a plate.

4. The beam shaper as recited in claim 1, wherein the reflection device is equally apart from the reflectors substantially.

5. The beam shaper as recited in claim 1, wherein the reflectors are arranged in a ring shape.

6. The beam shaper as recited in claim 1, wherein the number of the reflectors is equal to the number of the reflection surfaces.

7. The beam shaper as recited in claim 1, wherein the shaped light spot is substantially rectangular.

8. The beam shaper as recited in claim 1, wherein the incident light beam exhibits a circular light spot.

9. The beam shaper as recited in claim 8, wherein the incident light beam is a laser beam.

10. The beam shaper as recited in claim 1, wherein the angles of the reflectors can be adjusted to change the working distance of the beam shaper.

11. The beam shaper as recited in claim 1, wherein the shaped light spot is located on a surface of a processed object.

12. The beam shaper as recited in claim 11, wherein the shaped light spot is capable of forming a rectangular aperture on the surface of the processed object.

13. The beam shaper as recited in claim 1, wherein the shaped light spot is formed by diverging the reflected light beams after they are focused.

14. A beam shaper, comprising:
a reflection device, disposed on a transmission path of an incident light beam and comprising a plurality of reflection surfaces capable of reflecting the incident light beam and splitting the incident light beam into a plurality of reflected light beams; and
a plurality of reflectors, separately disposed on transmission paths of the reflected light beams and capable of reflecting the reflected light beams so that a shaped light spot is formed by superimposing light spots of the reflected light beams;
wherein the reflection device is disposed between the shaped light spot and the reflectors; and
the number of the reflectors is four.

15. A beam shaper, comprising:
a reflection device, disposed on a transmission path of an incident light beam and comprising a plurality of reflection surfaces capable of reflecting the incident light beam and splitting the incident light beam into a plurality of reflected light beams; and
a plurality of reflectors, separately disposed on transmission paths of the reflected light beams and capable of reflecting the reflected light beams so that a shaped light spot is formed by superimposing light spots of the reflected light beams;
wherein the reflection device is disposed between the shaped light spot and the reflectors; and
the light spots of the reflected light beams are fan-shaped.

16. The beam shaper as recited in claim 15, wherein the radians of the fan-shaped light spots are substantially 90 degrees.

17. The beam shaper as recited in claim 15, wherein the fan-shaped light spots are superimposing to form the shaped light spot so that the spatial intensity distribution of the reflected light beams is uniform.

18. A beam shaper, comprising:
a reflection device, disposed on a transmission path of an incident light beam and comprising a plurality of reflection surfaces capable of reflecting the incident light beam and splitting the incident light beam into a plurality of reflected light beams; and
a plurality of reflectors, separately disposed on transmission paths of the reflected light beams and capable of reflecting the reflected light beams so that a shaped light spot is formed by superimposing light spots of the reflected light beams;
wherein the reflection device is disposed between the shaped light spot and the reflectors; and
the reflectors are chirp mirrors.

19. The beam shaper as recited in claim 18, wherein the reflected light beams travel back and forth between the reflectors and the reflection surfaces.

* * * * *